G. G. MORIN.
REAR AUTOMOBILE SIGNAL.
APPLICATION FILED JAN. 24, 1917.

1,290,639.

Patented Jan. 7, 1919.
3 SHEETS—SHEET 1.

WITNESSES
C. H. Reichenbach.
A. L. Kitchin.

INVENTOR
George G. Morin
BY
ATTORNEYS

G. G. MORIN.
REAR AUTOMOBILE SIGNAL.
APPLICATION FILED JAN. 24, 1917.
1,290,639.
Patented Jan. 7, 1919.
3 SHEETS—SHEET 2.
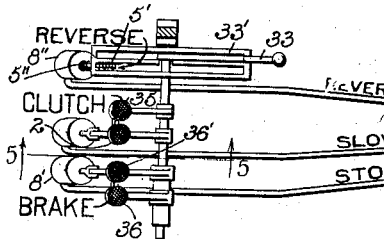
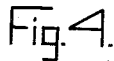
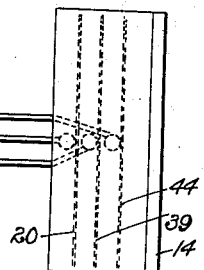
Fig. 4.
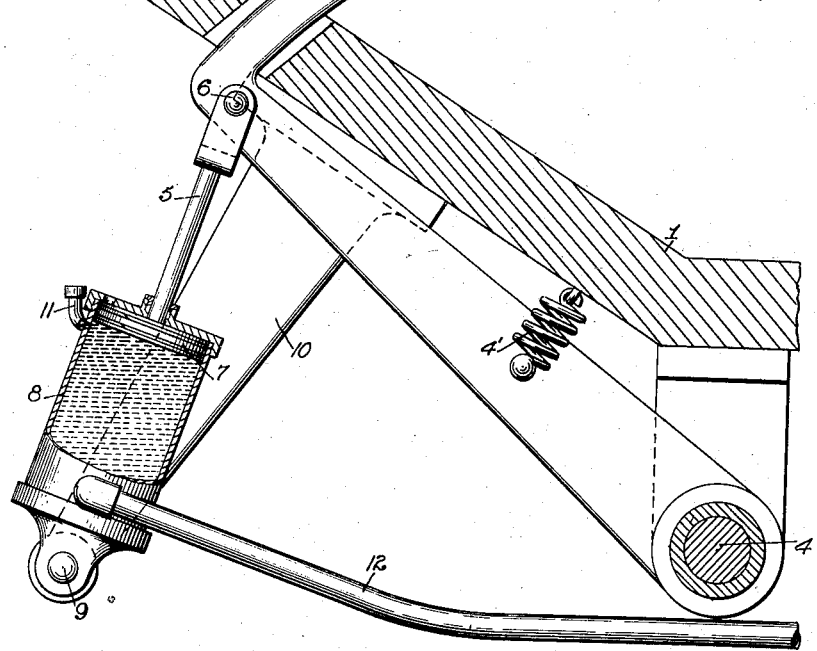
Fig. 5.
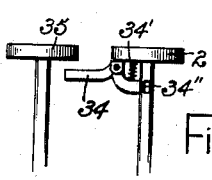
Fig. 11.
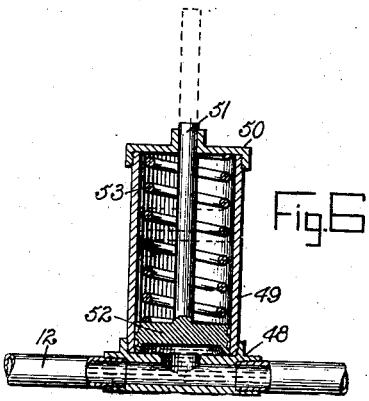
Fig. 6.
WITNESSES
C. H. Reichenbach
A. L. Kitchin
INVENTOR
George G. Morin
BY Munn & Co
ATTORNEYS G. G. MORIN.
REAR AUTOMOBILE SIGNAL.
APPLICATION FILED JAN. 24, 1917.
1,290,639.
Patented Jan. 7, 1919.
3 SHEETS—SHEET 3.
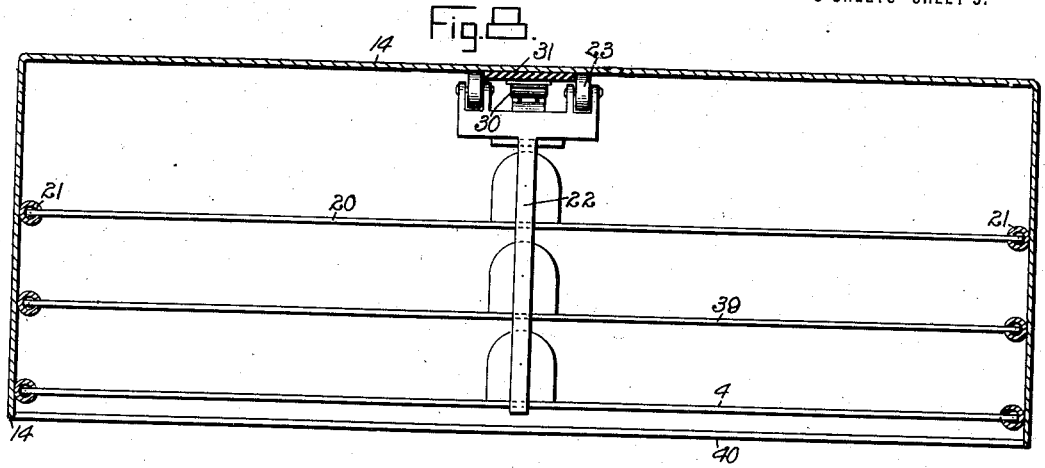
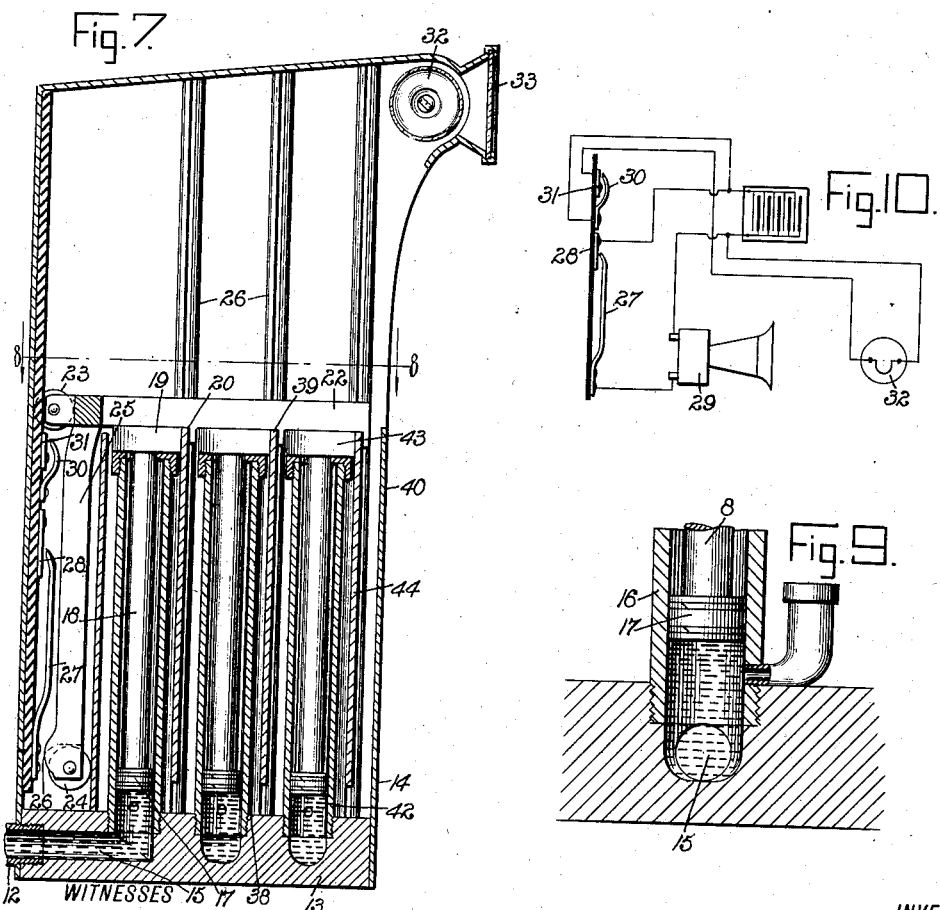
INVENTOR
George G. Morin

UNITED STATES PATENT OFFICE.

GEORGE G. MORIN, OF HOLYOKE, MASSACHUSETTS.

REAR AUTOMOBILE-SIGNAL.

1,290,639.　　　　Specification of Letters Patent.　　Patented Jan. 7, 1919.

Application filed January 24, 1917. Serial No. 144,161.

*To all whom it may concern:*

Be it known that I, GEORGE G. MORIN, a citizen of the United States, and a resident of Holyoke, in the county of Hampden and State of Massachusetts, have invented a new and Improved Rear Automobile-Signal, of which the following is a full, clear, and exact description.

This invention relates to signals for automobiles, and has for an object the provision of an improved construction which will automatically operate whenever the brake pedal is applied or the reversing lever is operated.

Another object in view is to provide a signal at the rear of the automobile operated from the front of the automobile through the use of fluid whereby the power may be transmitted without presenting unsightly and objectionable attachments.

In the accompanying drawings:

Figure 1 is a top plan view of part of an automobile with an embodiment of the invention applied thereto.

Fig. 2 is a side view of the structure shown in Fig. 1 with certain parts broken away for better illustrating the construction.

Fig. 4 is a top plan view of the operating mechanism of the invention.

Fig. 5 is a fragmentary sectional view on an enlarged scale showing how the slow pedal is connected to the fluid transmission member, the view being taken on line 5—5 of Fig. 4.

Fig. 6 is a detail fragmentary sectional view through a relief member arranged in the transmission line.

Fig. 7 is a longitudinal vertical section through the signal box and associated parts disclosing certain features of the invention.

Fig. 8 is a section through Fig. 7 on line 8—8.

Fig. 9 is a detail fragmentary view showing a filling arrangement in connection with the fluid transmission tube.

Fig. 10 is a diagram showing the electrical circuit, lamp and sounding member embodying certain features of the invention.

Fig. 11 is a detail front view of the clutch pedal and associate parts disclosing certain features of the invention.

Figure 3:
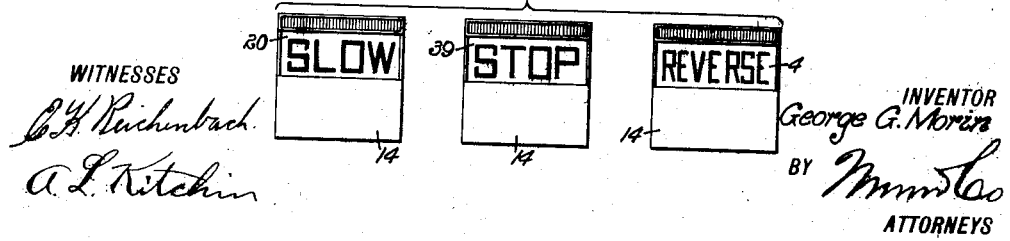
Fig. 3 is a view showing the three display plates in connection with the signal frame.

Referring to the accompanying drawings by numerals, 1 indicates an automobile of any desired kind which is provided with a slow pedal 2 and a controlling lever 3 used for reversing whenever desired. As shown in Fig. 5, the slow pedal 2 is loosely mounted on a shaft 4 and is normally held in a given position by a spring 4'. A piston rod 5 is pivotally mounted at 6 on the pedal 2, said piston rod carrying a piston 7 arranged in the cylinder 8, which cylinder is pivotally mounted at 9 on a bracket 10. A suitable filling inlet member 11 is provided for cylinder 8 so that liquid of any kind, as for instance, oil, may be placed in the cylinder 8. A pipe 12 is connected with cylinder 8 near the bottom through which the liquid is forced when the piston 7 has moved downwardly. The pipe 12 extends to the rear of the automobile, as shown in Fig. 4, and is connected to the base 13 of casing 14 in any suitable manner, as for instance, by being threaded therein. The fluid from pipe 12 flows through the passageway 15 in base 13 to a tubular member 16 which contains a piston 17 having a piston rod 18, which piston rod is connected to a bar 19, which bar in turn is connected to a plate 20 having arranged thereon words of any kind, as for instance, the word "Slow" as shown in Fig. 3. When the pedal 2 is moved downwardly the piston 7 (Fig. 5) will force the liquid through pipe 12 and into the tubular member 15 in the casing 14, whereby the plate 20 will be raised, the same being guided by the guideway 21. This will automatically present to view the word "Slow" to any one following the automobile as soon as the brake has been applied.

In addition to raising a visual sign, means are operated for producing an audible sound, as shown in Figs. 7 and 10. The frame 22 is arranged in casing 14 and is guided in its upward and downward movements by the guiding wheels 23 and 24, wheel 24 being mounted on a depending arm 25. As the plate 20 is elevated the same acts on the frame 22 and elevates said frame so that arm 25 will be elevated. Arm 25 is provided with a cam or raised portion 26 adapted to press against the spring 27 when moved a short distance upwardly and cause a contact between said spring and the plate 28, whereupon the circuit of the signal horn 29 will be closed. The signal horn will in this manner be sounded until the plate 20 has moved almost its full distance upwardly, whereupon the cam 26 will move off the spring 27 and on to a spring contact 30, which contact will be moved by the cam 26 until it engages the contact plate 31, whereupon the circuit of the horn or sounding device 29 will be opened and the circuit of the lamp 32 will be closed, whereupon a light will be provided for illuminating the word "Slow" and also for presenting a danger light 33 at the rear of the casing. The detail circuits for these two members, namely, the horn 29 and the lamp 32, may be varied as occasion may demand, the showing in Fig. 10 being provided for illustrating one way of producing the result desired. It is of course understood that a bell or other sounding device could be substituted for the horn 29.

By the construction and arrangement described, whenever the slow pedal 2 is moved downwardly a visual and audible signal will be operated at the rear of the automobile, the visual signal remaining until the pedal 2 has been released. Similar arrangements have been provided for indicating that the driver is going to stop or is going to reverse, so that the particular intention of the driver may be readily observed by any one following the automobile, said intention being given automatically and without any forethought of the driver, which is an advantage in case of accident, whereby the driver's attention is occupied in avoiding, if possible, any unnecessary injury to any party involved.

Figure 1:
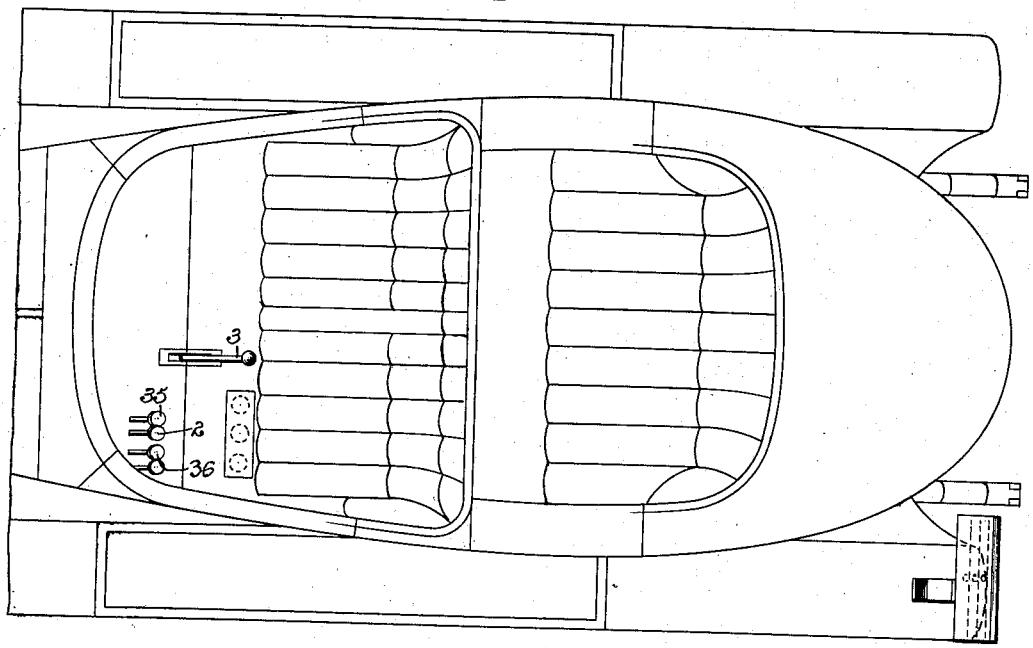
Figure 2:
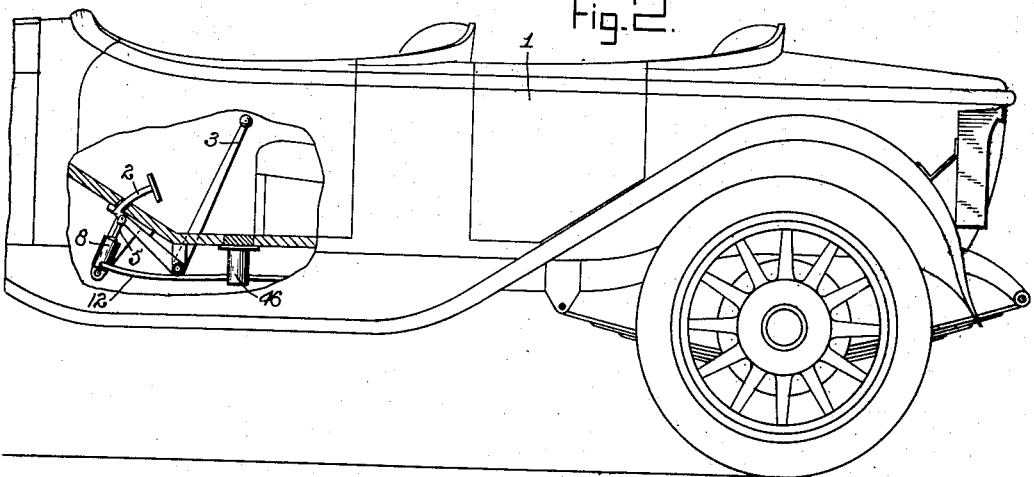

As shown in Figs. 4 and 11, the slow pedal 2 is provided with a pivotally mounted extension 34 which is held in the position shown in Fig. 11 by a retractile spring 34' whereby one end of the extension 34 will extend into one of the notches 34". There are provided preferably two notches so that the extension may be held in the position shown in Figs. 4 and 11 ordinarily, but in the country or any place where it is not desired to operate the signal device extension 34 may be moved pivotally and then swung around to another of the notches 34', whereupon the clutch pedal 35 may be operated without operating the signal. By providing the arrangement shown in Figs. 1 and 11, when it is desired to operate the slow signal the pedal 2 is depressed. When it is desired to slow up, pedal 35 is depressed, whereupon the clutch is thrown out and the "Slow" signal is raised to view as the pedal 35 strikes extension 34 and depresses said extension together with pedal 2.

The brake pedal 36 is associated with piston 8' and other parts similar to the disclosure in Fig. 5 so as to cause a movement of fluid through pipe 37, which pipe is in free communication with the cylindrical member 38 connected with the base 13 of casing 14. The pedal 38 is constructed identically with pedal 35 as shown in Fig. 11, while the pedal 36' is identical with pedal 2 shown in Fig. 11, whereby the operator may operate the stop signal without molesting the brakes. When the clutch lever or pedal 36 is operated for throwing out the clutch a sign plate will be raised so that the word "Stop" will appear. In case it is desired to stop the automobile suddenly the operator will quickly move the clutch pedal 36 and the brake pedal 35 so that the clutch will be thrown out substantially simultaneously with the application of the brake. This will cause both the plates 20 and 39 to be raised, but as plate 39 is in front of plate 20 the word "Stop" will be observed and the word "Slow" will be hidden.

In case it should become necessary to reverse while the machine is traveling forward or when standing stationary, the reverse lever 33, which is of the usual construction, may be operated for actuating a reversing mechanism. As shown in Fig. 4, said reverse lever is in the usual guiding frame or H 33' so that the clutches may be shifted to high and low speed at any time without effecting the reverse sign, but when the lever 33 is moved to the reverse position the same will press against the piston rod 5' and cause the fluid in the cylinder 8" to be forced through the pipe 41. This will cause the sign 44 to be raised and held in an elevated position as long as the reverse lever 33 is in a reverse position. When the reverse lever is moved to some other position the piston rod 5' will be moved back to its former position by a spring 5", whereupon the sign plate 44 will be lowered.

It will be noted that in each instance of the raising or elevation of the plates 20, 39 and 44 the frame 22 will be raised and an audible signal will be produced, as well as the lighting of the lamp 32. As shown in Figs. 4 and 6, relief members 45, 46 and 47 are provided in each of the pipes 12, 37 and 41. Each of these relief members or valves is provided with a base 48 for connecting the pipes thereto, said base having an upstanding threaded flange for receiving the tubular member 49, which tubular member has a cap 50 arranged thereon provided with an aperture, which apertures accommodates the rod 51 connected with a piston 52. A spring 53 acts against the cap 50 and against the piston 52 for normally holding the piston in the position shown in Fig. 6, but in case the pressure becomes too great on the liquid the piston 52 will be elevated and the remaining part of the system will not engaged. The relief members 45, 46 and 47 are provided for taking up a quick flow of fluid and in addition are provided for accommodating an excessive or extra amount of fluid in the system. In a system of this kind, and others where fluid is used, it has been found that a certain amount of leakage always takes place. The relief members are intended to accommodate this leakage as it will allow the operator to place an additional supply of fluid in the system and, consequently, compress the spring 53 to a certain extent when the system is first filled. Also, when the brake is being applied lightly it is desirable to have the sign "Stop" raised so that the cylinder 8 is provided with enough fluid to raise the plate 39 when the brake lever is only partially depressed. When the brake lever is completely depressed for forcing the brakes tightly in position the extra fluid in cylinder 8 will be forced into the relief members without in any way affecting the signal plate at the rear.

In case of an accident it is usual to stop as quickly as possible and, consequently, the operator forces the brake pedal 35 and the slow pedal 2 downwardly quickly. The fluid in the cylinder 8 or, in fact, in any of the other cylinders, cannot be forced instantly into the tubular members in casing 14 and therefore this relief is desirable as it will accommodate all of the fluid not in the remaining part of the system and will return more or less gradually the fluid forced therein. By providing a system of hydraulic transmission of power the parts may be arranged wherever desired and yet a proper thrust or movement provided for raising the sign plates at the rear. It will also be noted that the usual mechanism for operating an automobile need not be changed but may be operated in the usual manner and yet the signs at the rear will be properly actuated, the only change in regard to the operating mechanism being the addition of the slow pedal 2 which, if desired, may be entirely ignored, in which case the words "Stop" and "Reverse" would be the only ones utilized.

What I claim is:

1. In a signal for automobiles, a plurality of signal plates arranged at the rear of the automobile, hydraulically operated means for raising said plates, said means including a pipe for each plate extending to the front of the automobile, a cylinder connected to each pipe near the front end, a piston operating each of said cylinders, and means for connecting the respective pistons to the different controlling members of the automobile whereby when any controlling member is operated the corresponding signal plate will be raised at the rear of the automobile.

2. In a signal device for automobiles, a plurality of signal plates at the rear of the automobile, a hydraulic structure for each of said plates for raising the same, said hydraulic structure including a plurality of pipes, a relief member in each pipe, each of said relief members comprising a cylinder, a piston arranged in the cylinder and a spring for normally holding the piston in a given position and moving the piston back to said position when moved therefrom, and means for connecting the hydraulic structure with the controlling members of the automobile, whereby when any of said controlling members are operated the corresponding part of the hydraulic system will be operated for raising the particular signal plate at the rear associated therewith.

3. In a signal device for automobiles, a plurality of signal plates at the rear of the automobile, a hydraulic structure for each of said plates for raising the same, a pipe connected with each of said hydraulic structures extending to the front of the machine, there being one pipe for each shifting mechanism of an automobile, a cylinder connected with each of said pipes, a piston mounted in each of said cylinders, means connecting a cylinder with each of said operating mechanisms whereby when any erating mechanisms is operated the piston connected mechanism is operated the piston connected therewith will also be operated and the corresponding signal at the rear will be operated, and a spring for each of said pistons for causing the pistons to return to their former position when released and thereby acting on the liquid in the cylinder and pipes for reversing the action of said signals.

GEORGE G. MORIN.